US009111111B1

(12) United States Patent
Ramaswamy

(10) Patent No.: US 9,111,111 B1
(45) Date of Patent: Aug. 18, 2015

(54) LOCATION-BASED FILE SECURITY

(71) Applicant: Amazon Technologies, Inc., Reno, NV (US)

(72) Inventor: Sharadh Ramaswamy, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 22 days.

(21) Appl. No.: 14/034,067

(22) Filed: Sep. 23, 2013

(51) Int. Cl.
*G06F 21/00* (2013.01)
*G06F 21/62* (2013.01)

(52) U.S. Cl.
CPC .................................. *G06F 21/6218* (2013.01)

(58) Field of Classification Search
CPC .......... G06F 17/3087; G06F 17/30241; G06F 21/6218; G06F 21/6209; H04L 63/20; H04L 63/102
USPC .................................. 726/1; 713/165; 707/724
See application file for complete search history.

(56) References Cited

U.S. PATENT DOCUMENTS

| 6,212,635 | B1* | 4/2001 | Reardon | 713/165 |
| 7,017,183 | B1* | 3/2006 | Frey et al. | 726/5 |
| 2003/0182435 | A1* | 9/2003 | Redlich et al. | 709/229 |
| 2005/0138110 | A1* | 6/2005 | Redlich et al. | 709/201 |
| 2006/0120526 | A1* | 6/2006 | Boucher et al. | 380/247 |
| 2007/0079365 | A1* | 4/2007 | Ito et al. | 726/11 |
| 2011/0162050 | A1* | 6/2011 | Krajna et al. | 726/4 |
| 2012/0297189 | A1* | 11/2012 | Hayton et al. | 713/165 |
| 2013/0268775 | A1* | 10/2013 | Hawkins | 713/189 |

* cited by examiner

*Primary Examiner* — Matthew Smithers
(74) *Attorney, Agent, or Firm* — Sutherland Asbill & Brennan LLP

(57) ABSTRACT

Systems and methods for implementing location-based security protocols for information and/or data files are disclosed. The location-based security protocols may be enforced by an organization to protect and/or provide additional levels of security for information and/or data files associated with the organization and stored and/or used by agents of the organization on their user devices, such as personal user devices. Location-based security protocols may be applied to data file functions that include generating, receiving, transmitting, sharing, backing-up, or rendering a data file. Data files that are to adhere to one or more location-based security protocols may be tagged, such as in metadata associated with the data file to indicate that it is subject to adherence to the one or more location-based security protocols.

19 Claims, 8 Drawing Sheets

LOCATION-BASED FILE SECURITY

BACKGROUND

Users of electronic devices, such as personal user devices, may wish to use their user devices in certain locations where one may wish to implement additional file security. In some of these cases, individuals may wish to use their personal user devices in both a personal setting and a corporate setting, such as for both personal and business use. For example, employees of a company may want to use their personal smart phone and/or tablet computing device in a corporate setting. In many of these environments, the users may have proprietary, confidential, or sensitive data files on their personal user devices.

BRIEF DESCRIPTION OF THE DRAWINGS

The detailed description is set forth with reference to the accompanying figures. The use of the same reference numbers in different figures indicates similar or identical items; however, various embodiments may utilize elements and/or components other than those illustrated in the figures.

DETAILED DESCRIPTION

Overview

Figure 1:
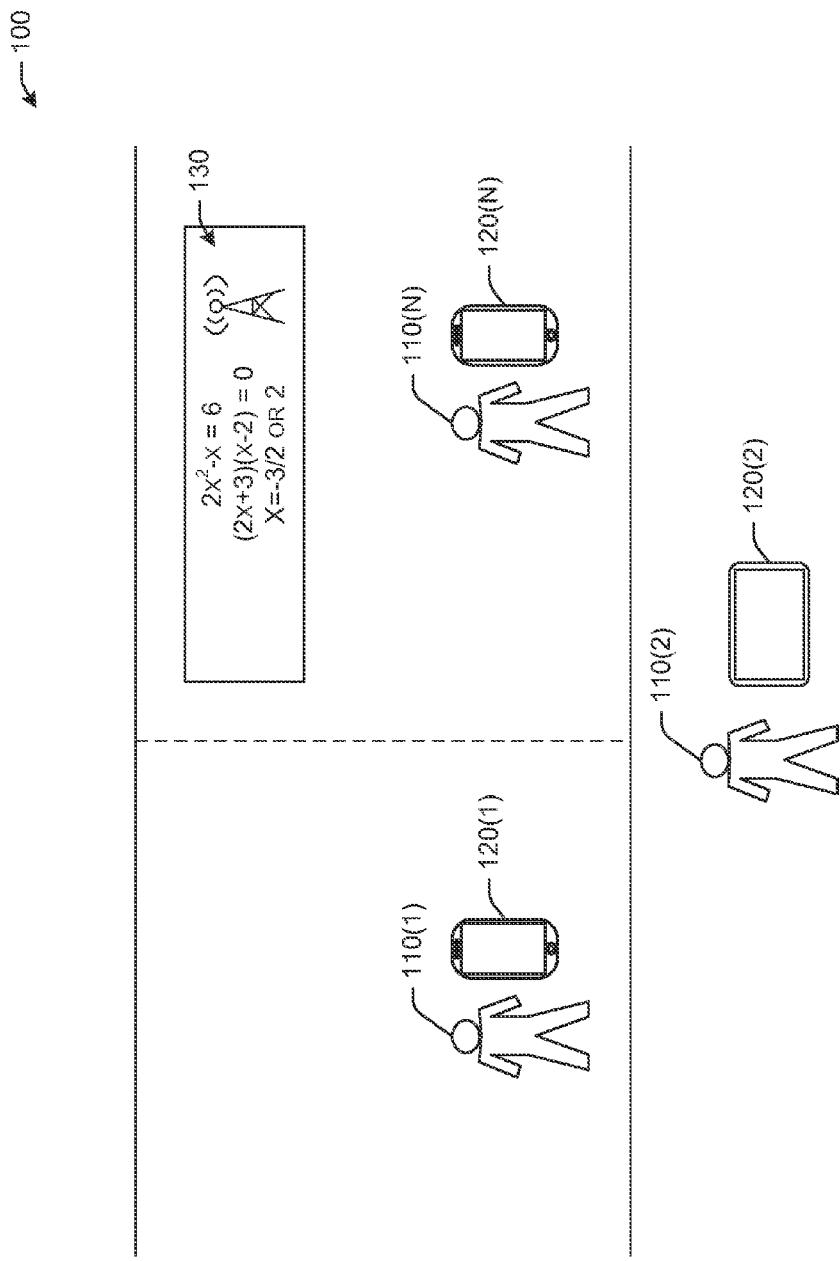
FIG. 1 is a schematic diagram that illustrates a use environment where location-based security may be implemented, in accordance with example embodiments of the disclosure.

Example embodiments of the present disclosure may include systems and methods for providing location-based file security. This location-based file security may be implemented on user devices that may be used to generate, store, utilize, and/or render confidential, sensitive, and/or proprietary information. In some example cases, the user devices may generate, store, utilize, and/or render non-confidential information in addition to the confidential information. The confidential information may be in the form of a data file that is generated, stored, utilized, and/or rendered by or on the user device. The user device may be any suitable user device including, but not limited to, tablet computing devices, electronic book (ebook) readers, netbook computers, notebook computers, laptop computers, desktop computers, personal digital assistants (PDA), smart phones, or the like. The data file may be any suitable data file including, but not limited to, an image file, an audio file, a video file, a text file, a document, a spreadsheet, a database, a computer program listing, software input files, software output files, combinations thereof, or the like.

The systems and methods as described herein may be utilized in a variety of settings where location-based information and/or data file security may be desired. For example, the disclosure herein may be utilized for securing information and/or data files of organizations that may wish to maintain confidentiality of its information and/or data files within and among its employees, suppliers, customers, partners, or the like (referred to hereinafter as agents of the organization). These organizations may wish to prevent, or at least minimize, the loss and/or disbursement of confidential or sensitive information and/or data by agents of the organization. Therefore, these organizations may wish to implement the location-based security protocols, as described herein, on user devices that are used by the agents of the organization. These location-based security protocols may particularly be used in situations where agents of the organization may have mixed use personal and business user devices. For example, it is a common trend that agents of an organization may bring in their personal user devices, such as their personal smart phones and/or tablet computing devices, into facilities, such as a work space, of the organization for mixed personal and business use. The organization may wish to allow the agents the flexibility of using their user devices for both personal and business use, but at the same time enforce a relatively greater level security for potentially sensitive and/or confidential information and/or data files associated with the organization.

The organization that wishes to enforce location-based security on information and/or data files associated with the activities of the organization may install security software, such as software that may be downloaded and/or registered from a security enforcement server associated with the organization. The security enforcement servers, in certain example embodiments, may maintain a registry of user devices that are authorized for use for the purposes of the organization's activities. The security enforcement servers, in further example embodiments, may provide locations where data files are to adhere to one or more location-based security protocols. In example cases, these locations may identify locations, such as various facilities and/or campuses of the organization (e.g. Generic Co.—Atlanta Campus, Generic Co.—New York Campus), where the generated and/or received files may be subject to location-based security protocols. In further example cases, the locations may further identify locations where there may be a relatively lower threshold of required location-based security, such as a home of the agent of the organization. In still further example cases, the locations may identify particularly high-risk locations where relatively stringent levels of location-based security may be applied, such as public places. The locations provided by the security enforcement servers may be in any suitable format including, but not limited to, spatial coordinates (e.g. latitude and longitude), identification of nearby communications infrastructure (e.g. Wi-Fi access points or mobile communications infrastructure), or the like. In certain example embodiments, locations provided by the security enforcement servers may be stored locally on the user device, such as in memory of the user device that is configured to operate in accordance with location-based security, as described herein.

In certain example embodiments, when a particular data file is generated and/or received by a user device, the data file may be identified as one that is to adhere to one or more security protocols. This determination may be made based on the location of the user device when the data file is generated and/or received by the user device. The location of the user device when the data file is generated and/or received may be determined based at least in part on a variety of received signals including, but not limited to, global navigation satellite system (GNSS) signals (e.g. Global Positioning Satellite (GPS) signals), inertial sensors (e.g. accelerometer and/or gyroscope signals), and/or communications infrastructure (e.g. Wi-Fi access point (AP) or cellular signal), or combinations thereof. Determination of whether a data file is to be subject to location-based security may be determined by comparing the location associated with the generation and/or receipt of the data file with a listing of secure locations associated with the organization enforcing the location-based security. When a data file is identified as one that is to adhere to one or more security protocols, that data file may be tagged to indicate that it is to adhere to security protocols. Tagging the data file may be by any suitable mechanism, such as by including an indication of the applicable security protocols as metadata, such as metadata in extensible markup language (XML) format, associated with the data file. In some example cases, the tag indicating security protocols may be appended to the data file, such as to a header portion of the data file or other portions where file related metadata may be appended.

In further example embodiments, when a data file is requested to be opened, utilized, rendered, and/or loaded, such as responsive to user request for the same, the user device may execute instructions stored thereon to identify if a location-based security tag is associated with the data file. Therefore, the user device may access the data file and identify if the data file is to adhere to location-based security protocols. For example, the user device may access and/or parse the metadata associated with the data file to determine if the data file is subject to location-based security protocols. In some cases, the user device may determine that it is not necessary for the requested data file to adhere to location-based security, such as if the data file is not tagged to indicate the adherence to location-based security protocols. If it is determined that the data file is not to adhere to location based security protocols, then the file may be opened, utilized, rendered, and/or loaded by the user device without any further security processes and/or restrictions. If, however, the data file is tagged, such as with or in metadata associated with the data file, then the security protocols to which the data file is to adhere may be identified. In some cases, the security protocols of the data file may be identified based at least in part on the data file tag.

The data file tag associated with a data file that is to adhere to location-based security protocols may indicate a variety of protocols and/or combinations of protocols. These protocols may be associated with a variety of location-based securities related to opening, sharing, backing-up, and/or rendering the data file. In certain example embodiments, a data file that is tagged for location-based security, may not be backed-up to just any remote server or cloud server. In other words, data files that are to adhere to location-based back-up security may be prevented from being backed-up to remote servers or cloud servers or may only be backed-up to pre-designated and/or secure remote servers. In further example embodiments, data files that are to adhere to location-based back-up security may need to be encrypted, such as by public-key encryption, prior to back-up.

In certain example embodiments, it may be determined, if a particular data file may be shared with other devices. In some example cases, a data file may be tagged to adhere to protocols by which the data file may not be shared with other user devices. In other example cases, a data file may be tagged to adhere to protocols where the data file may only be shared with other pre-designated and/or pre-identified user devices. In some example cases, the organization associated with the user device and that enforces the location-based security on the user device may provide identification, such as a listing of identifiers of user devices with which a particular data file may be shared. These other user devices that may be authorized for file sharing may belong to other agents of the organization enforcing location-based security and may further have location-based security software installed thereon. Therefore, in the context of data file sharing, in certain embodiments, the data files that are to adhere to location-based security may be shared with other user devices on which adherence to location-based security protocols are to be enforced.

In further example embodiments, when a data file is requested to be opened, utilized, rendered, shared, and/or loaded, such as responsive to user request for the same, the current location of the user device may be determined, such as by using GNSS signals, inertial sensors, or communications infrastructure within radio range of the user device. In these example cases, if the data file is to adhere to location-based security, the current location of the user device may be used to implement the location-based security protocols. In certain example-embodiments, it may be determined, if a particular data file may be shared with other devices. In some example cases, a data file may need to adhere to protocols by which the data file may be shared with other user devices only if the two sharing user devices are in a secure location, as determined by the current location of the user device. For example, under certain file sharing security protocols, a data file may be shared only within the facilities and/or premises, such as buildings, of the organization that may be implementing the location-based security.

In further example embodiments, rendering of data files that are to adhere to location-based security protocols may be subject to limitations of what input/output (I/O) or user interfaces of the user devices may be used for the rendering. In other words, based at least in part on the current location of the user device, a data file may not be rendered on certain I/O interfaces, such as I/O interfaces that may be easily viewed and/or heard by other non-authorized individuals in relative proximity of the user device. This protocol may ensure that when data files that are subject to location-based security protocols are rendered in a public place, such as a coffee shop or on a commercial aircraft, that data file may be rendered only on relatively private I/O interfaces, such as augmented reality (AR) glasses and/or headphones, rather than, for example, a display screen or speakers of the user device. Limiting the rendering of the data file to relatively private I/O interfaces may reduce the possibility of non-authorized individuals from viewing and/or hearing the information and/or content of potentially confidential and/or sensitive data files.

This brief introduction, including section titles and corresponding summaries, is provided for the reader's convenience and is not intended to limit the scope of the claims, nor the preceding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

FIG. 1 is a schematic diagram that illustrates a use environment 100 where location-based security may be implemented, in accordance with example embodiments of the disclosure. The environment may include one or more users 110(1), 110(2), 110(N), hereinafter referred to individually or collectively as users 110, that interact with their user devices 120(1), 120(2), 120(N), hereinafter referred to individually or collectively as user devices 120. The use environment 100 may be on the premises, such as a building or campus, of an organization with which the users 110 may be affiliated. For example, the users 110 may be employees, suppliers, customers, partners, or otherwise agents of the organization. The organization associated with the environment 100 may include, but is not limited to, companies, corporations, not-for-profit organizations, for-profit organizations, consortia, government entities, government contractors, non-government organizations, international organizations, combinations thereof, or the like. The organization may have one or more premises, locations, and/or facilities associated therewith. These premises, locations, and/or facilities may be campuses, buildings, portions of buildings, or the like.

The user devices 120, while depicted as a tablet computing device and smart phones, may be one of any variety of client devices, electronic devices, communications devices, and/or mobile devices. The user devices 120 may include, but is not limited to, tablet computing devices, electronic book (ebook) readers, netbook computers, notebook computers, laptop computers, desktop computers, personal digital assistants (PDA), smart phones, web-enabled televisions, video game consoles, set top boxes (STB), or the like. In some cases, the user device 120 may be the respective user's personal user device 120. In other words, a user may use his/her user device both in the environment 100 primarily for work associated with an organization associated with the environment 100 and for personal use. In some cases, the user device 120 may be provided to the respective user 110 by the organization associated with the environment 100. In other cases, the user 110 may obtain his/her user device 120 independent of the organization associated with the environment 100.

The user devices 120 may be configured to accept input from the user 110 to generate and/or receive data files. These data files, in certain example embodiments, may be received, such as from other user devices 120, via email, text message, file sharing, near field communications (NFC), downloading form a server, or other suitable mechanisms. In other example embodiments, the data file may be generated, such as by capturing an image, recording an audio file, entering text and/or drawings on the user device 120, or by any other suitable mechanism. For example, a particular user 110 may wish to take a picture of the information 130, as depicted. Therefore, a data file in the form of an image file may be generated containing the information 130. This information 130 may, in some example cases, be information that may be written on a white board, chalk board, projected onto a screen, or the like. This information 130, in some example case, may be collaborative work and/or a presentation of one or more of the users 110.

In certain example embodiments, the information 130 may be or may potentially be proprietary, confidential, and/or sensitive information. The organization associated with the environment 100 may wish to enforce one or more security protocols to protect its confidential information and/or data files associated therewith. The organization, may provide users 110 location-based security software and/or instructions to install on their user devices 120. In some example embodiments, organizations may require the installation of location-based security software to allow user devices 120 to operate and/or be brought into environment 100 or other locations associated with the organization.

Figure 2:
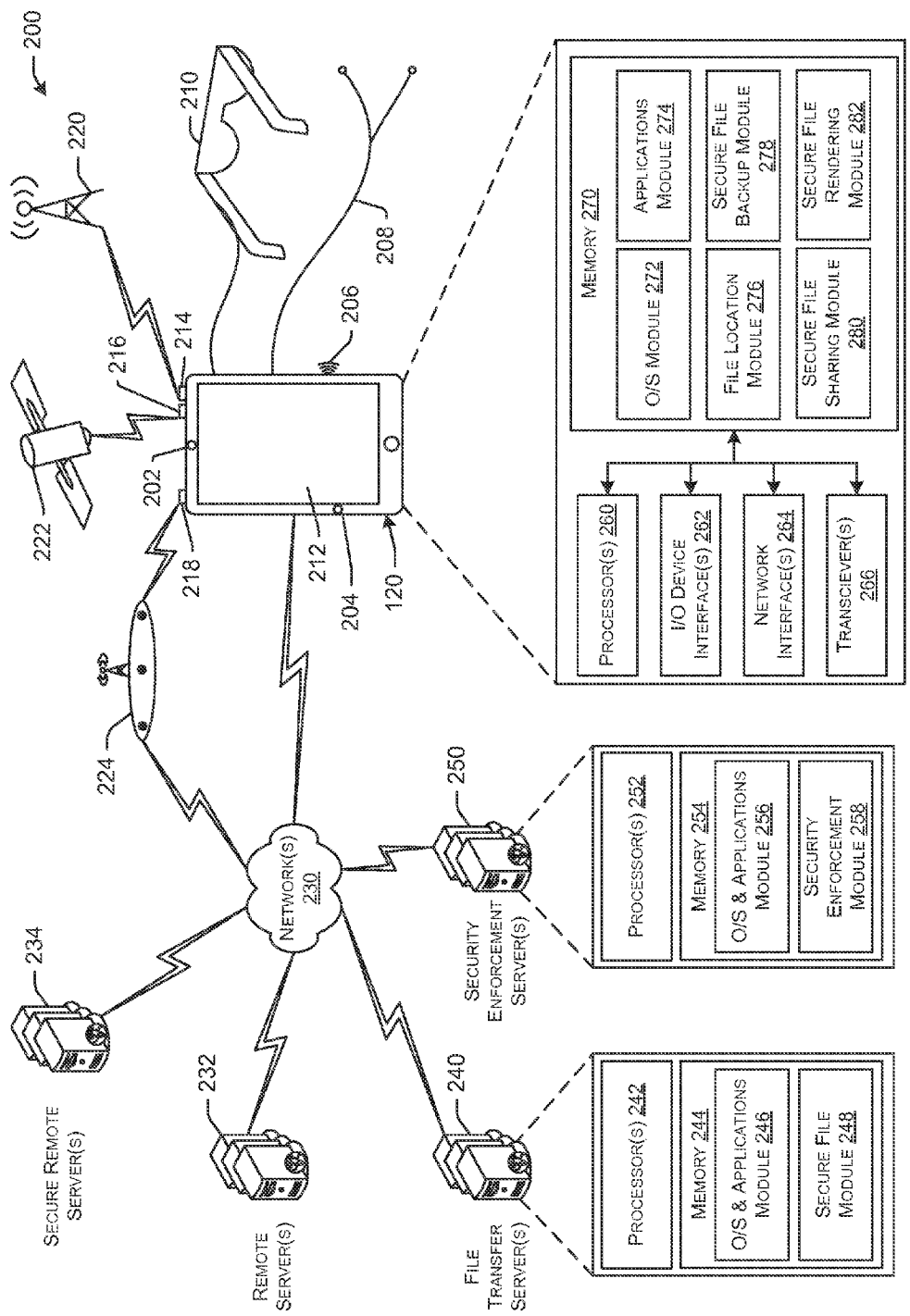
FIG. 2 is a schematic and block diagram that illustrates an environment including a user device and systems for implementing location-based security, in accordance with example embodiments of the disclosure.

FIG. 2 is a schematic and block diagram that illustrates an environment 200 including the user device 120 and systems for implementing the location-based security, in accordance with example embodiments of the disclosure. The user device 120, as depicted, may include a variety of user interfaces and/or input/output (I/O) interfaces to receive input from users 110 and render information, such as information contained in data files, to users 110. The I/O interfaces may include an image sensor 202, a microphone 204, a speaker 206, headphones 208, augmented reality (AR) glasses 210, and/or touch sensitive display screen 212. It will be appreciated that according to example embodiments of the disclosure, the user devices 120 may include other I/O interfaces not depicted here, such I/O interfaces that can interact with one or more senses of the users 110.

The user device 120 may further include one or more antennas 214, 216, 218, for receiving and/or transmitting a variety of radio frequency signals. In certain example embodiments, the user device 120 may be configured to receive and/or transmit communications signals from one or more communications infrastructure 220 via communications antenna 214, receive global navigation satellite system (GNSS) signals from one or more GNSS satellites 222 via GNSS antenna 216, and/or receive and/or transmit communications signals from one or more wireless access points (AP) 224, such as Wi-Fi APs, via communications antenna 218. The antennas 214, 216, 218 may be any suitable type of antenna corresponding to the signals to be received and/or transmitted by the user device 120. Some non-limiting examples of suitable antennas include Long Term Evolution (LTE), third generation (3G), fourth generation (4G), Wi-Fi antennas, IEEE 802.11 family of standards compatible antennas, directional antennas, non-directional antennas, dipole antennas, folded dipole antennas, patch antennas, multiple-input multiple-output (MIMO) antennas, or the like. The antennas 214, 216, 218 may be coupled to a respective radio and/or transceiver to transmit and/or receive communications signals and/or GNSS signals to/from the antennas 214, 216, 218.

The communications infrastructure 220 may enable communication with the user devices 120 using any suitable communication formats and/or protocols including, but not limited to, 3G mobile communication, 4G mobile communication, long-term evolution (LTE), WiMax, direct satellite communications, Wi-Fi, direct Wi-Fi, Bluetooth, or combinations thereof. A non-limiting example of a particular communications infrastructure 220 may be a cellular tower that provides communicative capability to the user devices 120. The communications infrastructure 220, in certain example embodiments, provide information, such as an identifier of the communications infrastructure 220 that may be used by the user device 120 to at least approximate its location. In some example cases, a user device 120 may be configured to receive RF signals from more than one communications infrastructure and may be configured to further triangulate its position based thereon with a relatively high level of accuracy and/or precision.

The GNSS satellite and/or constellation 222 may provide any suitable GNSS signal(s), such as GPS time and/or pseudo-range signals. The GNSS may be any one of known current GNSS or planned GNSS, such as the Global Positioning System (GPS), the GLONASS System, the Compass Navigation System, the Galileo System, or the Indian Regional Navigational System. The GNSS may include a plurality of satellites broadcasting radio frequency (RF) signals including satellite transmission time and position information. The user devices 120 may be configured to determine absolute and/or relative location information, such as longitude, latitude, and/or altitude, based at least in part on the GNSS signals received from the one or more GNSS satellites 222. In some example cases, the user devices may further include inertial sensors (not shown) such as accelerometers (e.g. micro-electromechanical systems (MEMS) based multi-axis accelerometers), and receive signals therefrom to enhance the location derived from GNSS signals.

The wireless AP 224 may be configured to provide communications services in one or more protocols and/or standards including, but not limited to, Wi-Fi, BlueTooth (BT), and/or Wi-Fi direct, or other suitable communications protocols. The user device 120 may be configured to receive communications signals and/or beacons form the wireless AP and determine a network identifier and/or wireless AP 224 identifier, such as a service set identification (BSSID) therefrom. The user device may further be configured to determine an approximate location where it is operating based at least in part on the network identifier and/or the wireless AP 224 identifier. In certain example embodiments, the wireless AP 224 may be a Wi-Fi access point or a wireless router. In these example embodiments, the communications protocols associated with the wireless AP 224 may be defined by various sections of Institute of Electrical and Electronics Engineers (IEEE) 802.11 standards. These standards may include, but may not be limited to, communications via 2.4 GHz channels (e.g. 802.11b, 802.11g, 802.11n), 5 GHz channels (e.g. 802.11n, 802.11ac), or 60 GHZ channels (e.g. 802.11ad).

The user device 120 may further be configured to access a variety of servers, such as a remote server 232, a secure remote server 234, a file transfer server 240, and a security enforcement server 250, via one or more networks 230. In example embodiments, the user device may establish a link to the one or more networks 230 via one or more of the wireless AP 224, the communications infrastructure 220, and/or other suitable communicative links.

The networks 220 may include any one of a combination of different types of suitable communications networks, such as cable networks, the Internet, wireless networks, cellular networks, and other private and/or public networks. Furthermore the networks 220 may include any variety of medium over which network traffic is carried including, but not limited to, coaxial cable, twisted wire pair, optical fiber, hybrid fiber coaxial (HFC), microwave terrestrial transceivers, radio frequency communications, satellite communications, or combinations thereof.

The remote servers 232 may be configured to receive information and/or data files from user devices 120 and back-up those data files. This type of remote and/or cloud storage may be employed for backing up data files that one may not want to lose. In other cases, is the user device 120 has limited memory or otherwise limited capacity to store data files, one may wish to store one or more of their data files remotely, such as on the remote servers 232. In some cases, these remote servers 232 may not adhere to strict security protocols and it may not be easy for an organization, such as organizations with confidential data to be backed-up form one or more user devices 120, to enforce and/or audit security of confidential information and/or data files uploaded to the remote servers 120.

In some cases, an organization may wish to direct potentially confidential data files to be backed-up to the one or more secure remote servers 234. The secure remote servers 234 may be configured to provide additional security features in cloud back-up of data. In some example embodiments, the secure remote servers 234 may be configured to encrypt data files that it receives and/or stores. In some further cases, the secure remote servers 234 may be configured to store data files that have been encrypted by the user devices 120 or other entities prior to receipt at the secure remote servers 234. In yet further example embodiments, the secure remote servers 234 may provide a greater level of access to organizations that may wish to enforce data security to, for example, identify potentially confidential data files that may be stored on the secure remote servers 234.

The file transfer servers 240 may be configured to transfer data files, including potentially confidential data files from one user device 120 to another user device 120. It will be appreciated that there may be various mechanism for data file transfer between user devices 120, including mechanisms that do not require file transfer servers 240, such as via Wi-Fi direct and/or direct-near field communication (NFC) file transfer. However, in some example embodiments, the user devices may be configured to perform file sharing and/or transfers via the file transfer servers 240. The file transfer servers 240 may include one or more processors 242 and memories 244.

In some examples, the processors 242 of the file transfer servers 240 may be implemented as appropriate in hardware, software, firmware, or combinations thereof. Software or firmware implementations of the processors 242 may include computer-executable or machine-executable instructions written in any suitable programming language to perform the various functions described. Hardware implementations of the processors 242 may be configured to execute computer-executable or machine-executable instructions to perform the various functions described. The one or more processors 242 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The file transfer servers 240 may also include a chipset (not shown) for controlling communications between the one or more processors 242 and one or more of the other components of the file transfer servers 240. The one or more processors 242 may also include one or more application specific integrated circuits (ASICs) or application specific standard products (ASSPs) for handling specific data processing functions or tasks.

The memory 244 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The memory 244 may store program instructions that are loadable and executable on the processor(s) 242, as well as data generated or received during the execution of these programs. Turning to the contents of the memory 244 in more detail, the memory 244 may include one or more operating systems (O/S) and applications module 246 and a secure file module 248. Each of the modules and/or software may provide functionality for the file transfer servers 240, when executed by the processors 242. The modules and/or the software may or may not correspond to physical locations and/or addresses in memory 244. In other words, the contents of each of the modules 246, 248 may not be segregated from each other and may, in fact be stored in at least partially interleaved positions on the memory 244.

The O/S and applications module 246 may have one or more operating systems stored thereon. The processors 242 may be configured to access and execute one or more operating systems stored in the O/S and applications module 246 to operate the system functions of the file transfer servers 240. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like. The O/S and applications module 246 may further contain instructions and/or applications thereon that may be executed by the processors 242 to provide one or more services.

The secure file module 248 may have instructions stored thereon that when executed by the processors 242, the file transfer servers 240 may be configured to provide a variety of file sharing based security functions, such as location-based file sharing security. The file transfer servers 240 and processors 242 thereon may be configured to receive a request for sharing and/or transfer of a data file. This request may include one or more of an identification of the requesting and/or recipient user device 120 and/or a current location of the data file source user device 120 and/or the data file recipient user device 120.

The processors 242 may further receive the data file for which a sharing request has been received via the networks 230 or other suitable communicative link. The processors 242 may be configured to parse portions of the received data file, such as metadata associated with the data file to identify one or more tags that indicate one or more security protocols to which the data file is to adhere for at least the purposes of file sharing and/or file transfer. If an appropriate tag is not found by the processors 242 in the data file and/or associated metadata, then the processors 242 may be configured to proceed with transferring the file without any additional location-based security. If however, the processors 242 identify that the data file is to adhere to location-based security, the processors 242 may be configured to verify if the data file may be shared at all. If the processors 242 determine that the data file may be shared, then the processors 242 may be configured to determine if the recipient user device 120 is approved for transfer of the file, such as by accessing a listing and/or database of approved recipient user devices 120 for the data file to be transferred. Additionally, the processors 242 may be configured to determine if the current location associated with either or both of the source user device 120 and/or the recipient user device 120 is approved for transfer of location-based secured data files according to the tag of the data file. If the processors 242 determine that the current location is within a safe zone, such as on the premises of the organization implementing the location-based security, then the processors 242 may be configured to proceed with the file transfer as requested. If the current location does not permit the transfer and/or sharing of the data file of the sharing request in accordance with the location-based security protocols imposed on the data file, the file transfer servers 240 and the processors 242 thereon may be configured to generate and transmit a message to one or both of the source user device 120 and/or the recipient user device 120 indicating that the transfer may not take place at the current location.

It will be appreciated that there may be overlap in the functionality of the instructions stored in the O/S and applications module 246 and secure file module 248. In fact, the functions of the aforementioned modules 246, 248 may interact and cooperate seamlessly under the framework of the file transfer servers 240. Indeed, each of the functions described for any of the modules 246, 248 may be stored in any module 246, 248 in accordance with certain example embodiments of the disclosure. Further, in certain example embodiments, there may be one single module that includes the instructions, programs, and/or applications described within the O/S and applications module 246 and secure file module 248.

The security enforcement servers 250 may be configured to enforce security protocols, such as location-based security protocols for an organization on user devices 120 used by agents of the organization. In some example cases, the user devices may be used by users 110 (e.g. agents of the organization) for both personal use and for business related to the organization. The security enforcement servers 250 may include one or more processors 252 and memories 254. The processors 252 and the memory 254 of the security enforcement servers 250 may be similar to the processors 242 and memory 244 of the file transfer servers 240 and, therefore, in the interest of brevity, these elements will not be described again.

The memory 254 may store program instructions that are loadable and executable on the processor(s) 252, as well as data generated or received during the execution of these programs. Turning to the contents of the memory 254 in more detail, the memory 254 may include one or more operating systems (O/S) and applications module 256 and a security enforcement module 248. Each of the modules and/or software may provide functionality for the security enforcement servers 250, when executed by the processors 252. The modules and/or the software may or may not correspond to physical locations and/or addresses in memory 254. In other words, the contents of each of the modules 256, 258 may not be segregated from each other and may, in fact be stored in at least partially interleaved positions on the memory 254. The O/S and applications module 256 of the security enforcement servers 250 may be similar to the O/S and applications module 246 of the file transfer servers 240 and, therefore, in the interest of brevity, the description of the same will not be repeated here.

The security enforcement module 258 may have instructions stored thereon that when executed by the processors 252, the security enforcement servers 250 may be configured to provide a variety of data file location-based security functions. The processors 252 may be configured to identify a user device 120 to be used in a secure location, such as a secure location of the organization with which the security enforcement servers 250 are affiliated. The processors 252 may further be configured to provide secure file management software to the identified user device 120. Further still, the processors 252 may be configured to receive confirmation of the installation of the secure file management software from the user device and/or an intermediate entity. The security enforcement servers 250 and the processors 252 thereon may further be configured to provide information associated with secure locations and/or protocols to the user device 120 on which the location-based security software is to be installed.

It will be appreciated that there may be overlap in the functionality of the instructions stored in the O/S and applications module 256 and security enforcement module 258. In fact, the functions of the aforementioned modules 256, 258 may interact and cooperate seamlessly under the framework of the security enforcement servers 250. Indeed, each of the functions described for any of the modules 256, 258 may be stored in any module 256, 258 in accordance with certain example embodiments of the disclosure. Further, in certain example embodiments, there may be one single module that includes the instructions, programs, and/or applications described within the O/S and applications module 256 and secure file module 258.

The user devices 120 may include one or more processors 260, one or more I/O device interfaces 262, one or more network interface(s) 264, one or more transceiver(s) 266, and one or more memories 270. The processors 260 and the memory 270 of the user devices 120 may be similar to the processors 242 and memory 244 of the file transfer servers 240 and, therefore, in the interest of brevity, these elements will not be described again.

The input/output (I/O) interface(s) such as the touch sensitive display screen 212, speaker 206, AR glasses 210, headphones 208, image sensor 202, microphone 204, haptic interface(s), or the like, may be controlled via the one or more I/O device interfaces 262. The network interfaces(s) 264 may allow the user device 120 to communicate via networks 230 and/or via other communicative channels.

The transceiver 266 may include any suitable radio for transmitting and/or receiving radio frequency (RF) signals in the bandwidth and/or channels corresponding to the communications protocols utilized by the user device 120 to communicate with other user devices 120 and/or entities via the networks 230. The transceiver 266 may include hardware and/or software to modulate communications signals according to pre-established transmission protocols. The transceiver 266 may further have hardware and/or software instructions to communicate via one or more Wi-Fi and/or Wi-Fi direct protocols, as standardized by the Institute of Electrical and Electronics Engineers (IEEE) 802.11 standards. In certain embodiments, the transceiver 266, in cooperation with the communications antennas 214, 218, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In alternative embodiments, non-Wi-Fi protocols may be used for communications by the user device 120, such as Bluetooth, dedicated short-range communication (DSRC), or other packetized radio communications. The transceiver 266 may include any known receiver and baseband suitable for communicating via the communications protocols of user device 120. The transceiver 266 may further include a low noise amplifier (LNA), additional signal amplifiers, an analog-to-digital (A/D) converter, one or more buffers, and/or digital baseband.

The memory 270 may store program instructions that are loadable and executable on the processor(s) 260, as well as data generated or received during the execution of these programs. Turning to the contents of the memory 270 in more detail, the memory 270 may include an operating system (O/S) module 272, an applications module 274, a file location module 276, a secure file back-up module 278, a secure file sharing module 280, and a secure file rendering module 282. Each of the modules and/or software may provide functionality for the user device 120, when executed by the processors 260. The modules and/or the software may or may not correspond to physical locations and/or addresses in memory 270. In other words, the contents of each of the modules 272, 274, 276, 278, 280, 282 may not be segregated from each other and may, in fact be stored in at least partially interleaved positions on the memory 270.

The O/S module 272 may have one or more operating systems stored thereon. The processors 260 may be configured to access and execute one or more operating systems stored in the (O/S) module 272 to operate the system functions of the user device 120. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application(s) module 274 may contain instructions and/or applications thereon that may be executed by the processors 260 to provide one or more services. These instructions and/or applications may, in certain aspects, interact with the (O/S) module 272 and/or other modules of the user device 120. The applications module 274 may have instructions, software, and/or code stored thereon that may be launched and/or executed by the processors 260 to execute one or more applications and functionality associated therewith. These applications may include, but are not limited to, functionality such as capturing a picture, recording a sound, capturing a video, web browsing, business, communications, graphics, word processing, publishing, spreadsheets, databases, gaming, education, entertainment, media, project planning, engineering, drawing, or combinations thereof. In certain embodiments, the applications that are stored in the applications module 274 and executable by the processors 260 may provide services for location-based security of data files.

The instructions and/or functionality stored in the file location module 276 may be executed by the processors 260 to provide a variety of location related functionality of the user device 120. The processors 260 may be configured to receive an indication of receiving and/or generating a data file. Upon receiving this indication, the processors 260 may be configured to determining a location associated with the generation and/or receipt of the data file. If the processors 260 identify that the location associated with the generation and/or receipt of the data file is a secure location, such as on the premises of the organization enforcing the location-based security protocols on the user device 120, then the processors 260 may be configured identify a location-based protocol associated with the data file per the policies of the organization. Upon identifying a location-based protocol, such as protocols associated with data file sharing, data file back-up, and/or data file rendering, the processors 260 may be configured to generate and/or modify pre-existing metadata associated with the data file. In effect the data file may be tagged with an identifier that indicates that the data file is to adhere to one or more location-based security protocols. The tag may be in any suitable format including, but not limited to, extensible markup language (XML) format.

The processors 260 may further be configured to execute the instructions stored in the file location module to identify an incoming request for an action on a data file. The processors 260 may further be configured to determine if the data file is subject to location-based security protocols, and if it is, which security protocols are to be enforced on the data file. The processors 260 may be configured to determine the relevant security protocols associated with the data file by parsing the data file, or portions thereof, such as metadata associated with the data file, to find tags that indicate adherence to one or more location-based security protocols. The processors 260 may further be configured to determine if the location-based security protocols associated with the data file requires identification of the current location of the user device 120. If the current location is indeed required, then the processors 260 may be configured to determine from one or more of GNSS satellite 222 signals, wireless AP 224 signals, communications infrastructure 220 signals, and/or inertial sensor signals, the current location of the user device 120 for use in adhering to all relevant and tagged location-based security protocols of the data file.

The instructions and/or functionality stored in the secure file backup module 278 may be executed by the processors 260 to configure the user device 120 to execute a variety of data file back-up security protocols. In one aspect, the processors 260 may be configured to receive a request, such as a request generated responsive to user 110 interaction with the user device 120 to request backing-up a data file. Responsive to receiving the request for data file back-up, the processors 260 may be configured to identify if the data file is subject to location-based back-up security based at least in part on the tag associated with the data file. The processors 260 may be configured to identify if the data file may not be backed-up at all and, if that is the case, the processors 260 may be configured to generate a message indicating that the data file is not permitted to be backed-up. Alternatively, the processors 260, in certain example embodiments, may be configured to determine if the data file is to be backed up to secure remote servers 234 rather than remote servers 232. Additionally, in the same or different example embodiments, the processors 260 may be configured to determine, based at least in part on the tag, if the data file is to be encrypted prior to transmitting to the secure remote servers 234 or the remote servers 232 for back-up. If the data file is to be encrypted prior to back-up, then the processors 260 may be configured to encrypt the data file prior to transmission to the secure remote servers 234 or the remote servers 232 for back-up.

The instructions and/or functionality stored in the secure file sharing module 280 may be executed by the processors 260 to configure the user device 120 to execute a variety of data file sharing and/or transfer security protocols. The processors 260 may be configured to parse portions of the data file to be transferred, such as metadata associated with the data file to identify one or more tags that indicate one or more sharing related security protocols to which the data file is to adhere for at least the purposes of file sharing and/or file transfer. If an appropriate tag is not found by the processors 260 in the data file and/or associated metadata, then the processors 260 may be configured to initiate transferring the file without any additional location-based security, either directly with the receiving user device 120 or via the file transfer servers 240. If however, the processors 260 identify that the data file is to adhere to location-based security, the processors 260 may be configured to verify if the data file may be shared at all. If the processors 260 determine that the data file may be shared, then the processors 260 may be configured to determine if the recipient user device 120 is approved for transfer of the file, such as by accessing a listing and/or database of approved recipient user devices 120 for the data file to be transferred. This listing may be provided to the user device 120 from the security enforcement servers 250 when installing the location-based security enforcement software. In some example embodiments, the listing and identifiers of approved recipient user devices 120 may be stored on the memory 270 of the user device 120.

Additionally, the processors 260 may be configured to determine if the current location associated with either or both of the source user device 120 and/or the recipient user device 120 is approved for transfer of the location-based secured data file. If the processors 260 determine that the current location is within a safe zone, such as on the premises of the organization implementing the location-based security, then the processors 260 may be configured to proceed with the file transfer as requested. If the current location does not permit the transfer and/or sharing of the data file of the sharing request in accordance with the location-based security protocols imposed on the data file, the user device 120 and the processors 260 thereon may be configured to generate and display a message to the user 110, such as on the touch sensitive display screen 212, indicating that the transfer may not take place at the current location.

The instructions and/or functionality stored in the secure file rendering module 282 may be executed by the processors 260 to configure the user device 120 to execute a variety of data file rendering functions. The processors 260 may be configured to parse portions of the data file to be rendered, such as metadata associated with the data file to identify one or more tags that indicate one or more rendering related security protocols to which the data file is to adhere for at least the purposes of rendering the data file on the user device 120, such as to the user 110 to provide the information and/or content associated with the data file. If an appropriate tag is not found by the processors 260 in the data file and/or associated metadata, then the processors 260 may be configured to initiate rendering the data file without any additional location-based security, on any appropriate I/O interface 206, 208, 210, 212 of the user device 120. If however, the processors 260 identify that the data file is to adhere to location-based security protocol, the processors 260 may be configured to determine the current location of the user device 120 and determine if the number and/or type of I/O interfaces 206, 208, 210, 212 are to be limited. In some example embodiments, if the current location is identified as a relatively public location, then the data file may only be rendered on relatively private I/O interfaces, such as the AR glasses 210 or the headphones 208, instead of the speakers 206 or the touch sensitive display screen 212.

It will be appreciated that there may be overlap in the functionality of the instructions stored in the operating system (O/S) module 272, the applications module 274, the file location module 276, the secure file back-up module 278, the secure file sharing module 280, and the secure file rendering module 282. In fact, the functions of the aforementioned modules 272, 274, 276, 278, 280, 282 may interact and cooperate seamlessly under the framework of the user device 120. Indeed, each of the functions described for any of the modules 272, 274, 276, 278, 280, 282 may be stored in any module 272, 274, 276, 278, 280, 282 in accordance with certain example embodiments of the disclosure. Further, in certain example embodiments, there may be one single module that includes the instructions, programs, and/or applications described within the operating system (O/S) module 272, the applications module 274, the file location module 276, the secure file back-up module 278, the secure file sharing module 280, and the secure file rendering module 282.

It will be appreciated that in certain example embodiments of the disclosure, one or more of the elements of the environment 200 may be protected by (i.e. "behind") a firewall, such as a corporate firewall. For example, in some cases, the security enforcement servers 250 and the secure remote servers 234 may be behind the corporate firewall, while the remote servers 232 and the file transfer servers 240 may not be behind the corporate firewall. In other example embodiments, the file transfer servers 240 may also be behind the corporate firewall. The user device 120 may sometimes operate behind the corporate firewall and sometimes operate outside the protection of the corporate firewall. In some example embodiments, the user device 120 and the processors 260 thereon may be configured to enforce security protocols that may require actions (backing-up, sharing, and/or rendering) to be performed on a data file tagged to be subject to location-based security only while the user device 120 is protected by a corporate firewall.

Illustrative Processes

Figure 3:
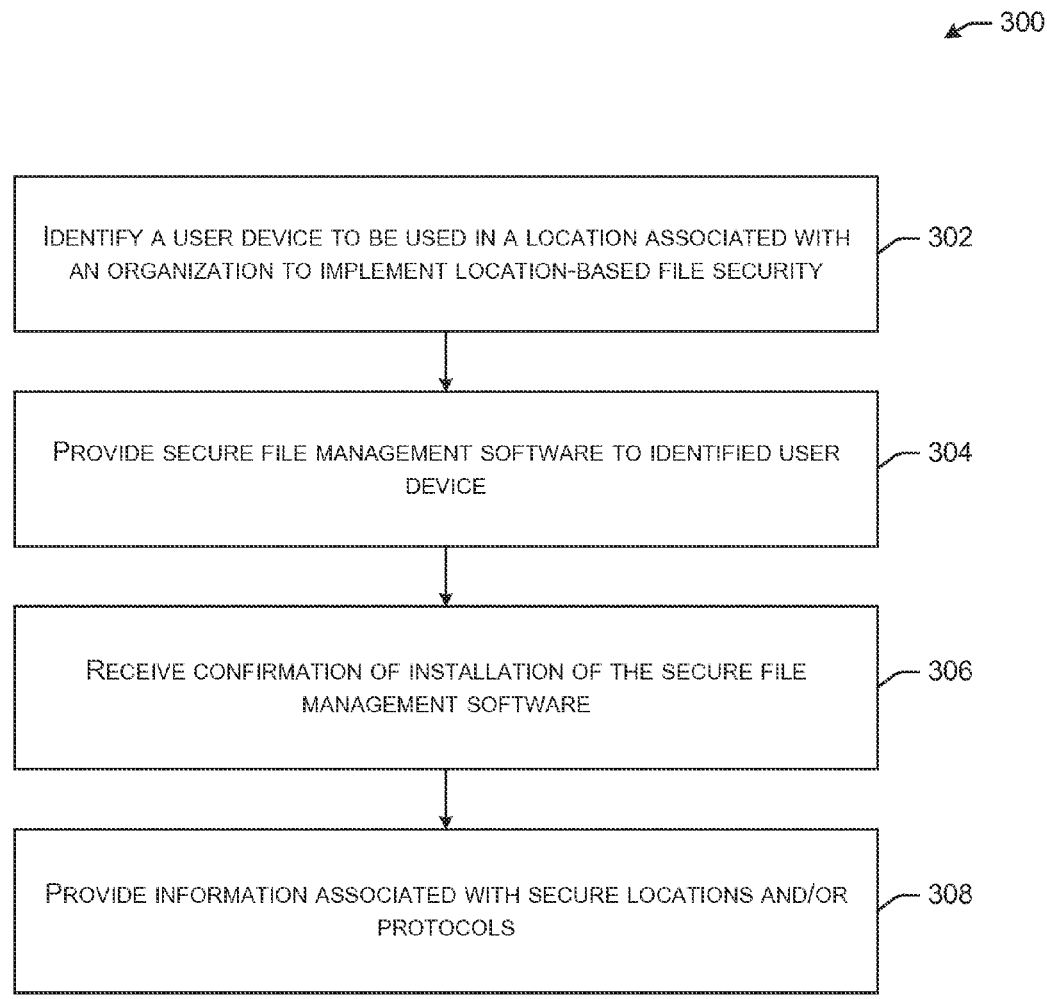
FIG. 3 is a flow diagram illustrating an example method for implementing location-based security on a user device, in accordance with example embodiments of the disclosure.

FIG. 3 is a flow diagram illustrating an example method 300 for implementing location-based security on a user device, in accordance with example embodiments of the disclosure. In certain example embodiments, the method 300 may be performed by security enforcement servers 250 and the processors 252 thereon. At block 302, a user device to be used in a location associated with an organization to enforce location-based file security may be identified. These locations may include premises, campuses, and/or physical infrastructure, such as buildings, of the organization. In example embodiments, the locations may be where agents of the organization may create, modify, and/or utilize confidential and/or sensitive information and data files associated therewith.

At block 304, secure file management software may be provided to the identified user device. This secure file management software may be transmitted by the security enforcement servers 250 and processors 252 thereon to the user device 120 via the networks 230. The secure management software, may be installed on the user device 120 and upon installation, may provide the various location-based security instructions, applications, and/or modules discussed in reference to user device 120, such as modules 272, 274, 276, 278, 280, 282.

At block 306, confirmation of the installation of the secure file management software may be received. This confirmation, in certain example embodiments, may automatically be transmitted by the user device 120 to the security enforcement servers 250. In some example embodiments, the organization implementing the location-based security protocols may allow the user device 120 onto the organization's premises only after confirmation of the installation of the secure file management software on the user device 120.

At block 308, information associated with secure locations and/or protocols may be provided. This information may be transmitted form the security enforcement servers 250 to the user device 120 via the networks 230. Upon transfer of the secure location and/or protocols information, the user device 120 may be enabled to perform location-based file security. The location information may include location identifiers of one or more of facilities of the organization, private but relatively secure locations, such as the private residences of the user 110 of the user device 120, and/or public locations. Additionally, in certain example embodiments, the security enforcement servers 250 may provide the user device 120 with information related to other user device 120 associated with the organization and also configured to provide location-based file security, such as identifiers of these "safe user devices 120."

It should be noted that the method 300 may be modified in various ways in accordance with certain embodiments. For example, one or more operations of the method 300 may be eliminated or executed out of order in other embodiments. Additionally, other operations may be added to the method 300 in accordance with other embodiments.

Figure 4:
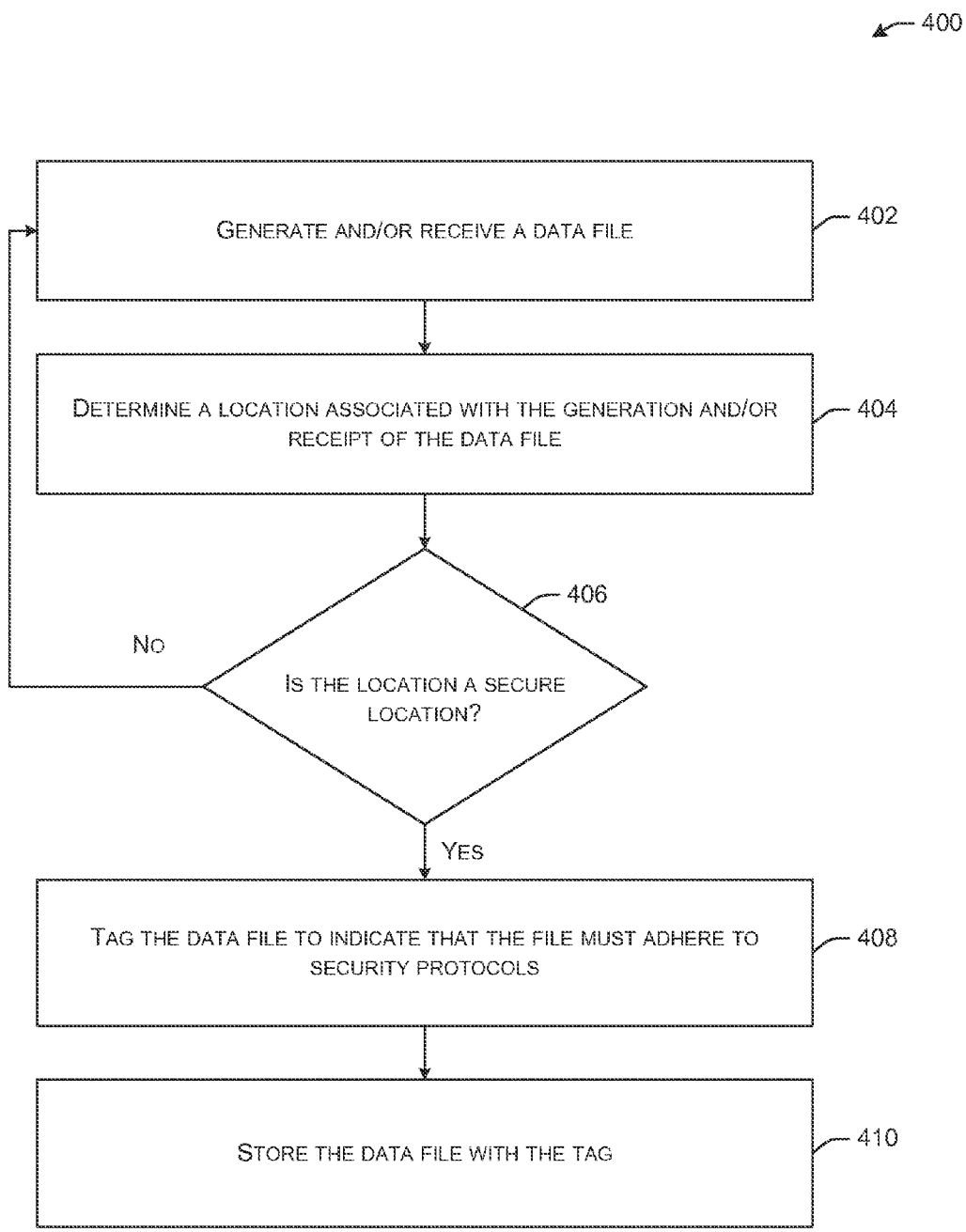
FIG. 4 is a flow diagram illustrating an example method for tagging a data file that is to adhere to location-based security, in accordance with example embodiments of the disclosure.

FIG. 4 is a flow diagram illustrating an example method for tagging a data file that is to adhere to location based security, in accordance with example embodiments of the disclosure. In certain example embodiments, the method 400 may be performed by the user device 120 and the processors 260 thereon. At block 402, a data file may be generated and/or received. In some cases, the data file may be received form another user device 120. In other cases, the user device 120 may generate the data file from a captured image, a recorded an audio clip, user entered text and/or drawings on the user device 120, or by any other suitable mechanism. For example, a particular user 110 may wish to record some sounds and generate an audio file therefrom.

At block 404, a location associated with the generation and/or receipt of the data file may be determined. This location may be the location of the user device 120 when the data file was received and/or generated by the user device 120. The location may be determined based at least in part on one or more of GNSS satellite 222 signals, inertial sensor signals, communications infrastructure 220 signals, and/or wireless AP 224 signals.

At block 406, it may be determined if the location determined at block 404 is a secure location. If it is determined that the location is not a secure location, then the method 400 may end and/or loop back to block 402 to generate and/or receive another data file. If however, at block 406, it is determined that the location is a secure location, then the method 400 may continue to block 408, where the data file may be tagged to indicate that it is to adhere to security protocols. The tag may indicate the security protocols to which the data file is to adhere. This tag may be included in metadata of the data file. In some example cases, the tagging may be performed by modifying the tag associated with the data file. At block 410, the data file with the tag may be stored. The data file may be stored in any suitable location, including, for example, the memory 270 of the user device 120.

It should be noted that the method 400 may be modified in various ways in accordance with certain embodiments. For example, one or more operations of the method 400 may be eliminated or executed out of order in other embodiments. Additionally, other operations may be added to the method 400 in accordance with other embodiments.

Figure 5:
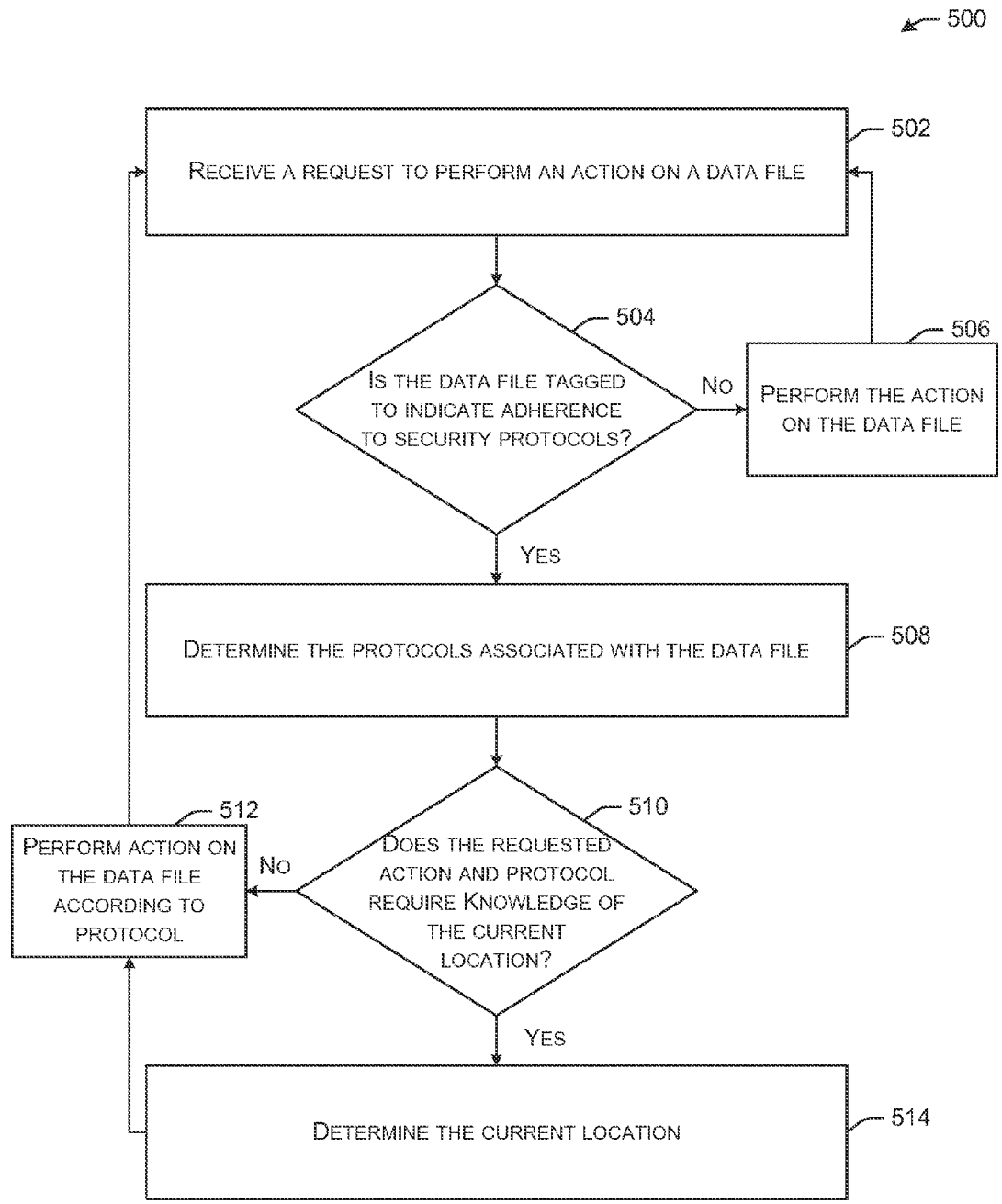
FIG. 5 is a flow diagram illustrating an example method for performing an action on a data file while implementing location-based security, in accordance with example embodiments of the disclosure.

FIG. 5 is a flow diagram illustrating an example method for performing an action on a data file while implementing location based security, in accordance with example embodiments of the disclosure. In certain example embodiments, the method 500 may be performed by the user device 120 and the processors 260 thereon. At block 502, a request to perform an action on a data file may be received. This action may be any suitable action including, but not limited to, backing-up the data file, sharing and/or transferring the data file, and/or rendering the data file, such as on the user device 120.

At block 504, it may be determined if the data file is tagged to indicate adherence to security protocols. If it is determined that the data file is not tagged to indicate adherence to security protocols, then, at block 506, the requested action may be performed on the data file and the method 500 may return to block 502. In this case the action may be performed by the user device 120 and the processors 260 thereon without any location-based security processes associated therewith.

If however, it is determined at block 504 that the data file is tagged to indicate adherence to security protocols, then the method may proceed to block 508, where the protocols associated with the data file may be determined. The protocols may be determined by identifying the tag and comparing it to predefined values of the tag corresponding to one or more location-based security protocols. For example, a particular tags may indicate a particular data file sharing location-based security protocol. Another tag may indicate a particular data file rendering location-based security protocol.

At block 510, it may be determined if the requested action and protocol require knowledge of the current location. If the current location is not required, then at block 512, the requested action may be performed on the data file in accordance with the protocols determined at block 508. If however, at block 510, it is determined that the requested action does require identifying the current location, then at block 514, the current location may be identified. Upon determining the current location, the method may proceed to block 512 where the requested action may be performed on the data file in accordance with the protocols determined in block 508 and the current location determined at block 514.

It will be appreciated that in some example embodiments, performing the action in accordance with protocols with which the data file is tagged, as in the process of block 512, may entail requiring the user device 120 to be connected to a corporate entity via a secure connection and/or be behind a corporate firewall. In other words, in these example embodiments, the protocol may dictate that the user device 120 be protected by the corporate firewall before an action, such as file updating, file sharing, and/or file rendering is performed on the data file that is tagged for location-based security.

It should be noted that the method 500 may be modified in various ways in accordance with certain embodiments. For example, one or more operations of the method 500 may be eliminated or executed out of order in other embodiments. Additionally, other operations may be added to the method 500 in accordance with other embodiments.

Figure 6:
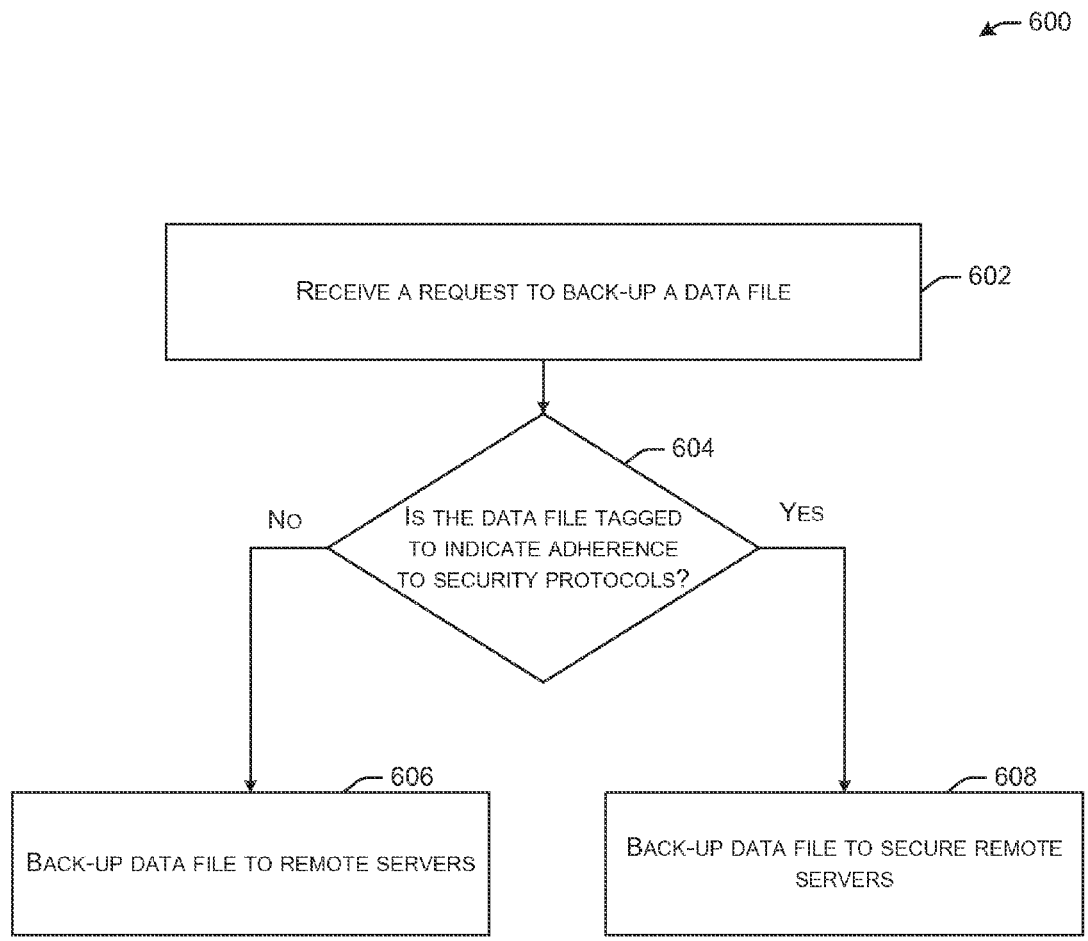
FIG. 6 is a flow diagram illustrating an example method for backing-up a data file while implementing location-based security, in accordance with example embodiments of the disclosure.

FIG. 6 is a flow diagram illustrating an example method for backing-up a data file while implementing location based security, in accordance with example embodiments of the disclosure. In certain example embodiments, the method 600 may be performed by the user device 120 and the processors 260 thereon. At block 602, a request to back up a data file may be received. This request may be received based on user 110 interaction with the user device 120 via one or more I/O interfaces 202, 204, 206, 208, 210, 212.

At block 604, it may be determined if the data file is tagged to indicate adherence to security protocols. This may be performed by processors 260 by parsing the data file, or portions thereof, such as metadata associated with the data file, to find tags that indicate adherence to one or more location-based security protocols, such as location-based back-up security protocols. If it is determined that the data file is not tagged to indicate adherence to security protocols, then, at block 606, the data file may be backed-up to remote servers 232. In other words, it may not be necessary to perform the back-up with the secure remote servers 234.

If however, it is determined at block 604 that the data file is tagged to indicate adherence to security protocols, then the method may proceed to block 608, where the data file may be backed-up to secure remote servers 234. In this case, the back-up may not be performed to the remote server 232.

In some alternate example embodiments, location-based security protocols, may require that the data file be encrypted prior to being backed up on either the remote server 232 or the secure remote server 234.

It should be noted that the method 600 may be modified in various ways in accordance with certain embodiments. For example, one or more operations of the method 600 may be eliminated or executed out of order in other embodiments. Additionally, other operations may be added to the method 600 in accordance with other embodiments.

Figure 7:
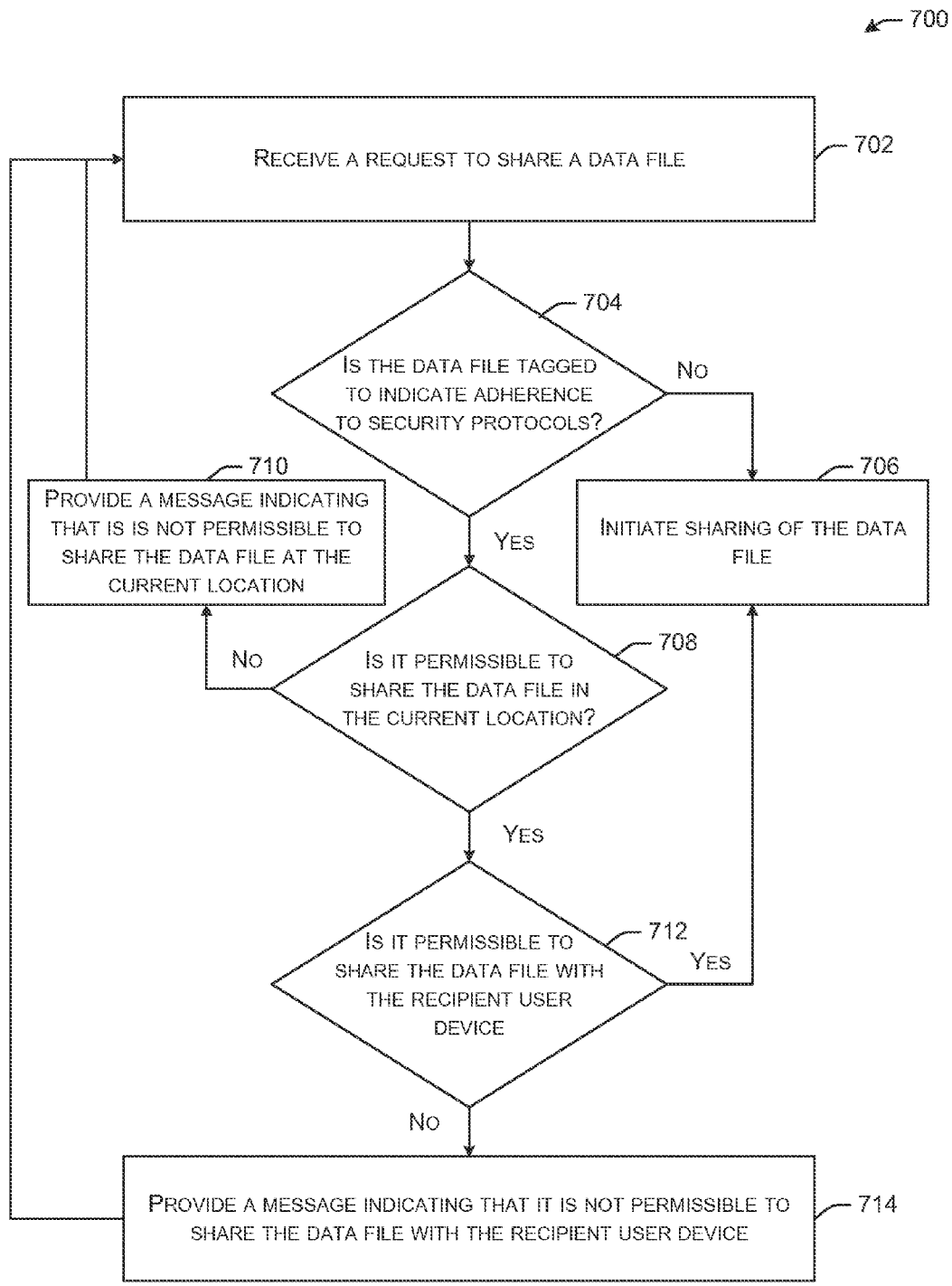
FIG. 7 is a flow diagram illustrating an example method for sharing a data file while implementing location-based security, in accordance with example embodiments of the disclosure.

FIG. 7 is a flow diagram illustrating an example method for sharing a data file while implementing location based security, in accordance with example embodiments of the disclosure. In certain example embodiments, the method 700 may be performed by the user device 120 and the processors 260 thereon. At block 702, a request to share a data file may be received. This request may be received based on user 110 interaction with the user device 120 via one or more I/O interfaces 202, 204, 206, 208, 210, 212. Alternatively this request may be received form another user device 120, such as the user device requesting the file to be shared, either directly and/or via the networks 230.

At block 704, it may be determined if the data file is tagged to indicate adherence to security protocols. This may be performed by processors 260 by parsing the data file, or portions thereof, such as metadata associated with the data file, to find tags that indicate adherence to one or more location-based security protocols, such as location-based sharing security protocols. If it is determined that the data file is not tagged to indicate adherence to security protocols, then, at block 706, sharing of the data file may be initiated. The data file may be shared directly between a source user device 120 and a recipient user device 120 or indirectly another entity, such as the file transfer servers 240.

If however, it is determined at block 704 that the data file is tagged to indicate adherence to security protocols, then the method may proceed to block 708, where it may be determined if it is permissible to share the data file in the current location. If it is determined that it is not permissible to share the data file in the current location, then the method 700 may proceed to block 710 where a message indicating that it is not permissible to share the data file in the current location may be provided. This message may be rendered to the user 110 on one or more I/O interfaces 206, 208, 210, 212.

If at block 708 it is determined that it is permissible to share the data file in the current location, then at block 712 it may be determined if it is permissible to share the data file with the recipient user device. This may be determined based on comparing the identification of the recipient user device to a registry of approved user devices 120 for sharing potentially confidential and/or sensitive data files. This registry of approved user devices 120 may be received form the security enforcement servers 250 and may be stored locally on the user device 120, such as on the memory 270. Alternatively the registry may be accessed remotely, such as via the networks 230, form another entity, such as the security enforcement servers 250. If it is determined that it is not permissible to share the data file with the recipient user device, then at block 714, a message indicating that it is not permissible to share the data file with the recipient user device may be provided. This message may be displayed to the user 110 of the user device 120 on one or more I/O interfaces 206, 208, 210, 212 of the user device 120. If however, it is determined that it is permissible to share the data file with the recipient user device, then at block 706, sharing of the data file may be initiated. The sharing of the data file may be performed directly between the source user device 120 and the recipient user device 120 or via an intermediary, such as the file transfer servers 240.

It will further be appreciated that in accordance with some example embodiments, sharing the data file tagged for location-based security may require the user device 120 to be connected to a corporate entity via a secure connection and/or be behind a corporate firewall. In this case, the protection of the corporate firewall may be instead of or in addition to the security requirements related to determining whether it is permissible to share the secure data file with a particular recipient user device 120.

It will also be appreciated that in certain example embodiments, the data file with location-based security may further be protected by and/or subject to digital rights management (DRM) and/or a conditional access system (CAS). In this case, the user device 120 may negotiate DRM and/or CAS access, as appropriate, with one or more other entities and/or comply with the agreements of the DRM and/or CAS prior to sharing the data file. Therefore, in certain case, a location-based security protocol may permit sharing a particular data file, but DRM and/or CAS requirements may prevent the sharing thereof.

It will be appreciated that in certain alternate example embodiments, the determination of if the file is to be shared may be determined by the file transfer servers 240 and the processors 242 thereon. In this case, the file transfer servers 240 may receive the data file to be shared from the source user device 120 and the identification of the recipient user device 120 may be determined from the data file sharing request received by the source user device 120.

It should be noted that the method 700 may be modified in various ways in accordance with certain embodiments. For example, one or more operations of the method 700 may be eliminated or executed out of order in other embodiments. Additionally, other operations may be added to the method 700 in accordance with other embodiments.

Figure 8:
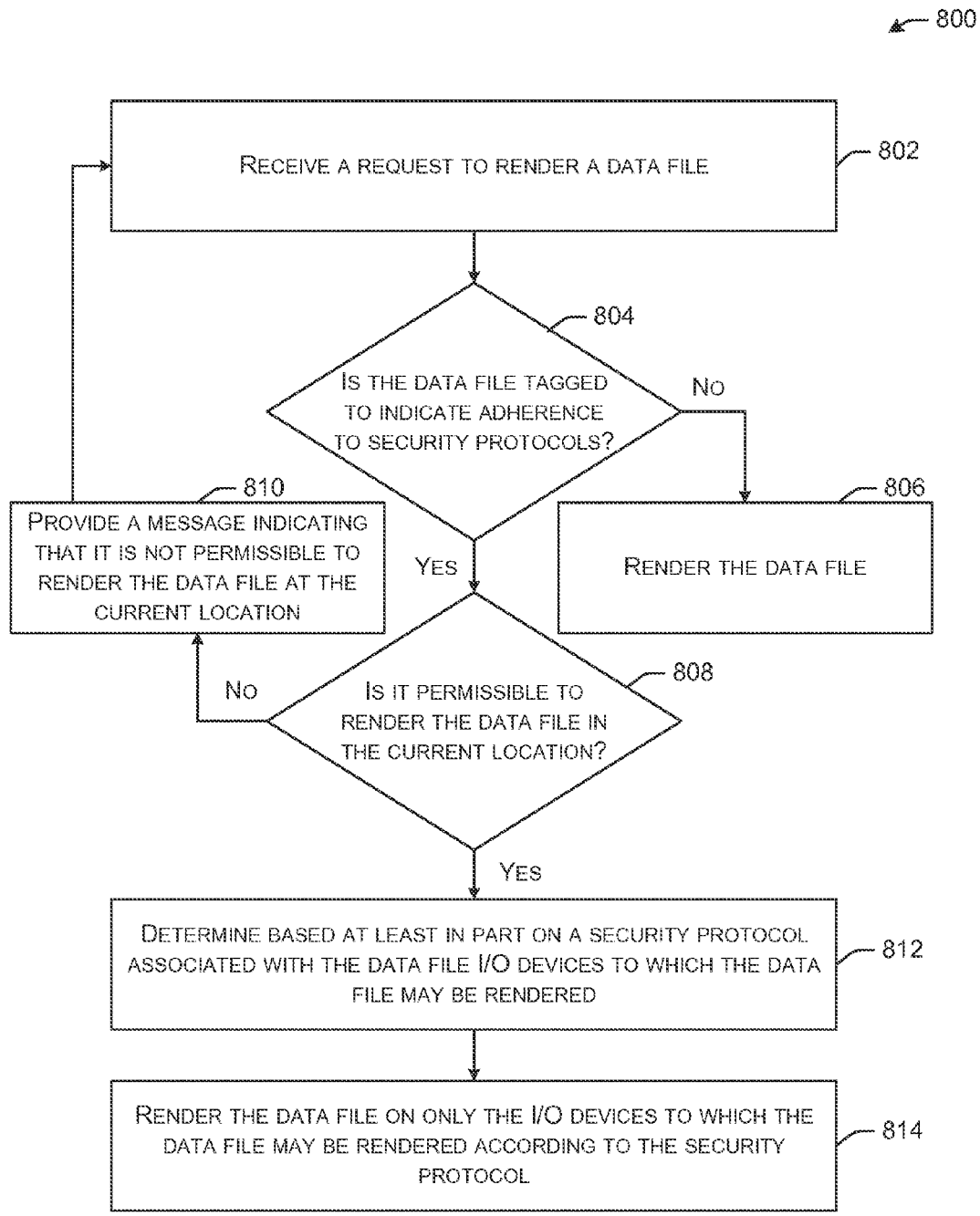
FIG. 8 is a flow diagram illustrating an example method for rendering a data file while implementing location-based security, in accordance with example embodiments of the disclosure.

FIG. 8 is a flow diagram illustrating an example method for rendering a data file while implementing location based security, in accordance with example embodiments of the disclosure. In certain example embodiments, the method 800 may be performed by the user device 120 and the processors 260 thereon. At block 802, a request to render a data file may be received. This request may be received based on user 110 interaction with the user device 120 via one or more I/O interfaces 202, 204, 206, 208, 210, 212.

At block 804, it may be determined if the data file is tagged to indicate adherence to security protocols. If it is determined that the data file is not tagged to indicate adherence to security protocols, then, at block 806, the data file may be rendered as requested. In some example cases, this may entail rendering the data file on one or more I/O interfaces 206, 208, 210, 212 of the user device 120.

If however, it is determined at block 804 that the data file is tagged to indicate adherence to security protocols, then the method may proceed to block 808, where it may be determined if it is permissible to render the data file in the current location. If it is determined that the data file may not be rendered at the current location, then the method 800 may proceed to block 810 where a message indicating that it is not permissible to render the data file at the current location may be provided.

If however it is determined that it is permissible to render the data file in the current location, then at block 812, I/O interfaces to which the data file may be rendered may be determined based at least in part on the security associated with the data file and the current location. At block 814, the data file may be rendered on only the I/O interfaces to which the data file may be rendered according to the security protocol. In some example embodiments, if the current location is identified as a relatively public location, then the data file may only be rendered on relatively private I/O interfaces, such as the AR glasses 210 or the headphones 208, instead of the speakers 206 or the touch sensitive display screen 212.

It will also be appreciated that in certain example embodiments, the data file with location-based security may further be protected by and/or subject to digital rights management (DRM) and/or a conditional access system (CAS). In this case, the user device 120 may negotiate DRM and/or CAS access, as appropriate, with one or more other entities and/or comply with the agreements of the DRM and/or CAS prior to rendering the data file. Therefore, in certain case, a location-based security protocol may permit rendering a particular data file, but DRM and/or CAS requirements may prevent the rendering thereof.

It should be noted that the method 800 may be modified in various ways in accordance with certain embodiments. For example, one or more operations of the method 800 may be eliminated or executed out of order in other embodiments. Additionally, other operations may be added to the method 800 in accordance with other embodiments.

Embodiments may be provided as a computer program product including one or more non-transitory machine-readable storage media having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, the distribution of software may be an Internet download.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed:

1. An electronic device, comprising:
    at least one memory that stores computer-executable instructions;
    at least one processor that accesses the at least one memory, wherein the at least one processor executes the computer-executable instructions to:
        receive a data file by taking a picture using a camera of the electronic device;
        determine a location associated with receiving the data file;
        determine, based at least in part on identifying that the location is associated with an organization, that a security protocol applies to the data file;
        generate a tag indicative of the security protocol;
        associate the tag with the data file;
        receive a request to perform an action on the data file, wherein the action comprises at least one of: (i) backing-up the data file, (ii) sharing the data file, or (iii) rendering the data file; and
        perform the action according to the security protocol.

2. The electronic device of claim 1, wherein the at least one processor executes the computer-executable instructions to associate the tag with the data file by at least one of: (i) generating metadata associated with the data file; or (ii) modifying metadata associated with the data file.

3. The electronic device of claim 1, wherein the request to perform an action comprises a request to back-up the data file and wherein the at least one processor further executes the computer-executable instructions to:
  determine based at least in part on the tag that the data file is to be backed-up to a secure remote server; and
  transmit the data file to the secure remote server.

4. The electronic device of claim 3, wherein the at least one processor further executes the computer-executable instructions to encrypt the data file prior to transmitting the data file to the secure remote server.

5. The electronic device of claim 1, wherein the request to perform an action comprises a request to share the data file and wherein the at least one processor further executes the computer-executable instructions to:
  identify, based at least in part on the request to share the data file, a second electronic device;
  determine, based at least in part on the tag, that the second electronic device is authorized for receiving the data file; and
  initiate the transfer of the data file to the second electronic device.

6. The electronic device of claim 1, wherein the request to perform an action comprises a request to render the data file wherein the at least one processor further executes the computer-executable instructions to:
  determine a current location of the electronic device;
  identify, based at least in part on the current location and the tag, one or more allowable output interfaces for rendering the data file; and
  render the data file on at least one of the one or more allowable output interfaces.

7. A method, comprising:
  receiving, by a user device comprising one or more processors, a request to perform an action on a data file associated with metadata, wherein the metadata indicates a security protocol and is associated with the data file based at least in part on a determination that the data file is associated with a secure location associated with an organization;
  parsing, by the user device, the metadata associated with the data file;
  identifying, by the user device and based at least in part on the metadata, the security protocol associated with the data file; and
  performing, by the user device, the action according to the security protocol, wherein the security protocol relates to at least one of a location associated with the data file or a current location of the user device.

8. The method of claim 7, wherein the action is backing-up the data file and wherein performing the action according to the security protocol comprises:
  determining, by the user device and based at least in part on the metadata, that the data file is to be backed-up to a secure remote server; and
  transmitting, by the user device, the data file to the secure remote server.

9. The method of claim 8, further comprising encrypting, by the user device, the data file prior to transmitting the data file to the secure remote server.

10. The method of claim 7, wherein the action is sharing the data file and wherein performing the action according to the security protocol comprises:
  identifying, by the user device and based at least in part on the request to perform an action on a data file, a second user device;
  determining, by the user device and based at least in part on the metadata, that the second user device is authorized to receive the data file; and
  initiating, by the user device, the transfer of the data file to the second user device.

11. The method of claim 7, wherein the action is sharing the data file and wherein performing the action according to the security protocol comprises:
  determining, by the user device, a current location;
  identifying, by the user device and based at least in part on the metadata, that the data file is authorized for sharing at the current location; and
  initiating, by the user device, the transfer of the data file to a second user device.

12. The method of claim 7, wherein the action is rendering the data file and wherein performing the action according to the security protocol comprises:
  determining, by the user device, a current location;
  identifying, by the user device and based at least in part on the current location and the metadata, one or more allowable output interfaces for rendering the data file; and
  rendering, by the user device, the data file on at least one of the one or more allowable output interfaces.

13. At least one non-transitory computer-readable medium comprising computer-executable instructions that, when executed by one or more processors, executes a method comprising:
  receiving a data file;
  determining a location associated with the received data file;
  determine that the location is a secure location;
  determining, based at least in part on determining that the location is a secure location, that the data file is to adhere to a security protocol; and
  modifying, based at least in part on determining that the data file is to adhere to a security protocol, the data file with a tag indicating that the security protocol applies to the data file.

14. The at least one computer-readable medium of claim 13, wherein the method further comprises determining that the location is associated with an organization enforcing the security protocol.

15. The at least one computer-readable medium of claim 13, wherein modifying the data file with the tag comprises at least one of: (i) generating metadata associated with the data file; or (ii) modifying metadata associated with the data file.

16. The at least one computer-readable medium of claim 13, wherein the method further comprises:
  receiving a request to back-up the data file;
  determining, based at least in part on the tag, that the data file is to be backed-up to a secure remote server; and
  transmitting the data file to the secure remote server.

17. The at least one computer-readable medium of claim 16, wherein the method further comprises encrypting the data file prior to transmitting the data file to the secure remote server.

18. The at least one computer-readable medium of claim 13, wherein the method further comprises:
  receiving a request to share the data file;
  identifying, based at least in part on the request to share the data file, a second user device;

determining, based at least in part on the tag, that the second user device is authorized to receive the data file; and initiating the transfer of the data file to the second user device.

19. The at least one computer-readable medium of claim 13, wherein the method further comprises:
receiving a request to render the data file;
determining a current location;
identifying, based at least in part on the current location and the tag, one or more allowable output interfaces for rendering the data file; and
rendering the data file on at least one of the one or more allowable output interfaces.

* * * * *